United States Patent Office.

BALTHASAR KREISCHER, OF NEW YORK, N. Y.

Letters Patent No. 114,449, dated May 2, 1871.

IMPROVEMENT IN THE MANUFACTURE OF FIRE-BRICKS.

The Schedule referred to in these Letters Patent and making part of the same.

*To all whom it may concern:*

Be it known that I, BALTHASAR KREISCHER, of the city, county, and State of New York, have invented a new and useful Improvement in the Manufacture of Artificial Stone; and I do hereby declare the following to be a full, clear, and exact description thereof, which will enable those skilled in the art to make and use the same.

This invention relates more particularly to the manufacture of fire-bricks, and it is partly applicable to common bricks.

The invention consists—

First, in a fire-brick produced from kiln-dried clay, which, after having been ground, is put into molds in a dry state and then exposed to a pressure of from one thousand to two thousand pounds per square inch.

Secondly, in a dry-pressed brick treated with a solution of burned and raw clay, whereby a skin is produced on the surface of the brick and the durability of the article is materially increased.

Fire-clay, when molded into bricks in a soft state, is liable to so much shrinkage and warpage that bricks or other articles cannot be made with advantage in this manner.

It has therefore been a common practice in the manufacture of fire-bricks to form a portion of the fire-clay in lumps which are burned at a high heat, then ground and mixed with soft clay.

From this mixture bricks are formed, then dried in the open atmosphere or by artificial heat, then pressed, and again dried sufficiently to allow their introduction in the burning-kiln.

By this process the shrinkage of the fire-clay is somewhat reduced, and the bricks produced are not liable to crack while being dried and burned; but the process requires much manual labor, and the shrinkage is still much greater than desirable.

These disadvantages I have succeeded to obviate by my improved process for making fire-brick, which is carried out as follows:

I first dry the fire-clay in a kiln or in the open air, and then grind it to sizes to suit the different kinds of manufacture.

The dry ground mass I put into molds and expose to a pressure of from one thousand to two thousand pounds per square inch. Then I remove the bricks from the molds, when they can be used at once; or, if desired, they may be burned in the usual manner.

A fire-brick made according to this process is not liable to shrink any, while the shrinkage of a fire-brick made by the old process is from one to two inches per foot.

Furthermore, by following my process much labor is saved, and a superior article is produced at a reduced cost.

A dry-pressed brick made according to my process, however, is soft and porous, and if not protected by a skin its surface is liable to wear off.

I have therefore adopted the practice to dip the bricks, after the same have been burned, in a solution made by mixing burned clay finely pulverized and raw clay in about equal or any suitable proportions, and adding a sufficient quantity of water.

By dipping a dry-pressed brick, made as above described, in this solution a skin is produced on the surface of the brick which forms a protection and renders the surface smooth.

What I claim as new, and desire to secure by Letters Patent, is—

1. A fire-brick produced by drying the clay, grinding it, placing it into molds in a dry state, and subjecting it to a pressure from one to two thousand pounds to the square inch, substantially as described.

2. A dry-pressed brick made as described, and treated with a solution of burned and raw clay, substantially as set forth.

BALTHASAR KREISCHER.

Witnesses:
W. HAUFF,
E. F. KASTENHUBER.